United States Patent [19]

Petersen

[11] 4,251,194
[45] Feb. 17, 1981

[54] SPRING ARRANGEMENT FOR THE CONTROL VALVE OF A HYDROSTATIC STEERING UNIT

[75] Inventor: Hans C. Petersen, Nordborg, Denmark

[73] Assignee: Danvoss A/S, Nordborg, Denmark

[21] Appl. No.: 25,831

[22] Filed: Apr. 2, 1979

[30] Foreign Application Priority Data

Apr. 3, 1978 [DE] Fed. Rep. of Germany ....... 2814230

[51] Int. Cl.³ .......................... F03C 2/00; F16F 1/18; B62D 5/08
[52] U.S. Cl. .................. 418/61 B; 180/132; 267/164
[58] Field of Search ..................... 418/61 B; 91/375 R, 91/375 A, 467, 470; 137/625.24; 180/146–148, 132; 267/164

[56] References Cited

U.S. PATENT DOCUMENTS

| | | | |
|---|---|---|---|
| 3,385,057 | 5/1968 | Pruvot et al. | 91/375 |
| 3,528,521 | 9/1970 | Ellis | 91/467 |
| 3,819,307 | 6/1974 | Uppal | 418/61 B |
| 4,174,612 | 11/1979 | Liebert | 91/467 |

*Primary Examiner*—John J. Vrablik
*Attorney, Agent, or Firm*—Wayne B. Easton

[57] ABSTRACT

The invention relates to an improvement in the spring arrangement of the control valve assembly of a hydrostatic steering unit of the type having a measuring motor and relatively rotatable inner and outer concentric tubular valve members. In this type of unit one of the valve members is connected to the motor and the other valve member is manually rotated for steering purposes. The valve members have axially aligned and diametrically arranged slots for housing the spring arrangement which includes a pair of curved leaf springs and two supporting plates which may also be leaf springs.

4 Claims, 6 Drawing Figures

SPRING ARRANGEMENT FOR THE CONTROL VALVE OF A HYDROSTATIC STEERING UNIT

The invention relates to a spring arrangement for the control valve of a hydrostatic steering unit, comprising two leaf springs which are symmetrically oppositely curved at their middle and the ends of which lie against the walls of radial slots of two concentric tubular valve members which are relatively rotatable through a limited angle.

In a known control valve (U.S. Pat. No. 2,984,215), the one valve member consists of an inner sleeve rigidly connected to a steering spindle and the other valve member of an outer sleeve fixed to rotate with the rotor of a measuring motor. The two sleeves form a rotary slide valve which opens on relative rotation caused by the steering spindle and permits pressure fluid to pass from a pump by way of the measuring motor to a steering motor which adjusts the wheels and from there back to a tank. The measuring motor permits the outer sleeve to follow in response to the quantity of flowing pressure fluid until the valve has closed again. A lost motion clutch limits the relative rotation between the two valve members so that, on failure of the pump, the measuring motor acts as an auxiliary pump mechanically driven by the steering wheel.

The relative rotation between the two valve members takes place against the force of a spring arrangement which is compressed when the radial slots of the two valve members are displaced relatively to each other. In this way, rotation of the steering wheel occurs against a certain force which increases with the relative angle of rotation and which simulates the steering resistance encountered by mechanical steering through adjustment of the wheels on the road. This spring arrangement additionally ensures that the steering wheel returns to the neutral position when no load acts on it. The known spring arrangement comprises two pairs of leaf springs having two flat end sections with which they abut against the walls of the radial slots and central sections which are curved towards each other and by means of which they abut.

The invention is based on the problem of providing a spring arrangement of the aforementioned kind which can be less easily overstressed by bending stresses and which permits the torque to be applied through the steering spindle to be better adapted to practical requirements, particularly at the end of the permissible relative rotation and in the region of the neutral position.

This problem is solved according to the invention in that the leaf springs are curved in the same sense over substantially their entire length and are supported at the walls of the radial slots with the interpositioning of a respective planar supporting plate extending over the spring length.

If a curved leaf spring supported at both ends is loaded at the middle, the highest bending moment occurs in the middle. In addition, it changes its curvature in response to the local bending moment. If, as a result of increasing forces, the curvature at the middle of the spring approaches zero, the oppositely curved leaf springs lie flat against each other with one section. The result of this is that the forces are now already transmitted with a lower lever arm as referred to the supported ends. With increasing force, the flat section of the leaf spring therefore increases until finally the predominant part of the leaf spring length is flattened. The then remaining short free lever arm is no longer apt to deform markedly so that, on a further rise in the forces, the torque increases. In this way one ensures that the leaf spring is not impermissible loaded either by bending moments or by the consequent bending stresses. In addition, towards the end of the permissible relative rotation the resetting torque increases strongly. The driver therefore feels that the lost motion clutch will soon become effective. Further, it is ensured that the condition of full control is very rapidly returned when no torque is any longer applied to the steering spindle. Since no support is possible at the wall of the radial slot of the inner valve member because of the curvature that extends right through, the supporting plates are provided which ensure force transmission from the inner valve member onto the outer end of the curved leaf spring.

With particular advantage, the curved leaf springs are so prestressed in the neutral position that they lie flat on each other at the central portion. This ensures that even with very slight relative rotation out of the neutral position, an adequately large torque has to be applied by way of the steering spindle. Thereafter, comparatively small increases of the torque will suffice to pass through the subsequent section of the angular range before the torque increases steeply again at the end of this range. This construction with the steeply increase in torque at both sides of the neutral position gives a very accurate neutral position and a high degree of certainty that the control valve will return to the neutral position each time.

Further, the curved leaf springs may have a constant radius of curvature. On the one hand, this facilitates production. In addition, readily apparent and calculable conditions are produced when pressing flat.

The supporting plates may also be leaf springs. Since the lever arm disposed beyond the inner valve member is short, thick supporting plates are not required and it is possible to use thinner material.

The invention will now be described in more detail with reference to an example illustrated in the drawing, wherein.

Figure 1:
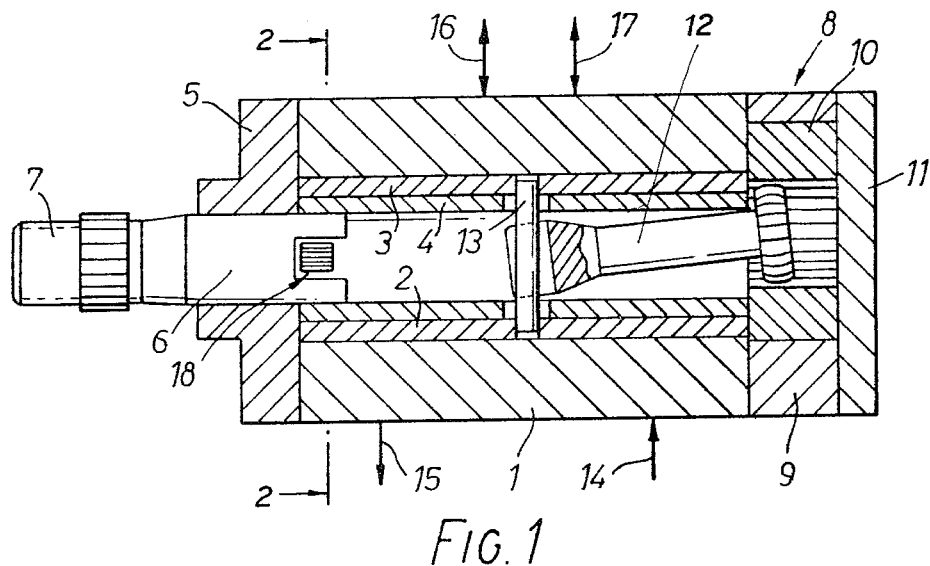
FIG. 1 is a diagrammatic longitudinal section through a control valve in which the spring arrangement according to the invention is utilised.

The control valve shown in FIG. 1 has in a housing 1 a bore 2 in which an outer tubular valve member 3 and, therein, an inner tubular valve member 4 are mounted. At one end there is a bearing cover 5 for mounting a steering spindle 6 which is rigidly connected to the valve member 4 such as by welding. A steering wheel or the like can be placed over the end 7 of the steering spindle 6. At the other side of the housing, a measuring motor is provided in the form of an inner-axial rotary piston motor. It comprises an outer gearing 9 which is internally toothed and, in engagement therewith, a rotatable gear 10 having one tooth less. Between the tooth elements there are compression chambers (not shown). All this is covered by a cover 11. The gear 10 is fixed to rotate with the outer valve member 3 by way of a cardan shaft 12 and a pin 13 loosely passing through the inner valve member 4. Further, there are four connections, namely a pump connection 14, a tank connection 15 and two connections 16 and 17 leading to a steering motor. In the control valve there are numerous passages and valve orifices which are not illustrated because they are known. They ensure that, on rotation of the steering spindle 6 and thus relative rotation between the valve member 4 and valve member 3, pressure fluid flows from the pump connection 14 by way of the valve members 3 and 4 to the measuring motor 8 and then further by way of one of the connections 16, 17 to the steering motor and from there by way of the control valve back to the tank connection 15. The measuring motor 10 turns and thereby makes the outer valve member 3 follow until the rotary slide valve 3, 4 is closed again. In this way the quantity of liquid fed to the steering motor is proportional to the rotation of the steering spindle 6.

Figure 2:
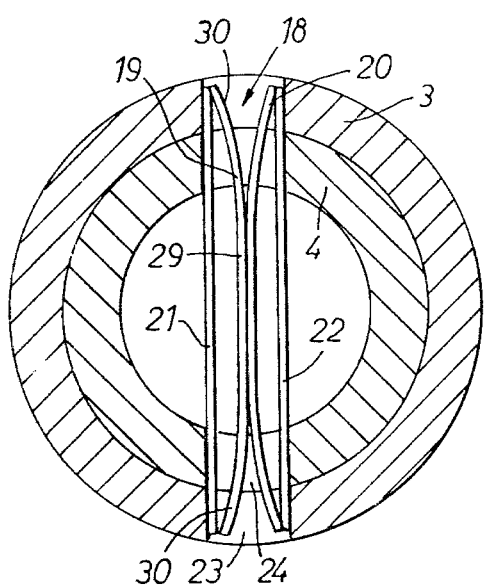
FIG. 2 is an enlarged section on the line A—A through the spring arrangement and the two tubular valve members in the neutral position.
Figure 3:
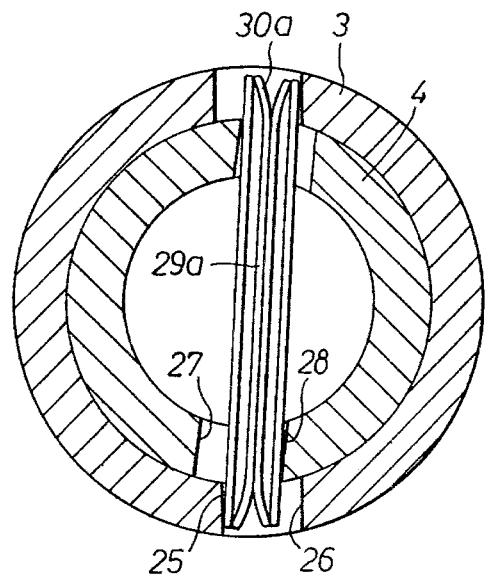
FIG. 3 is a section corresponding to FIG. 2 after relative rotation.

Because of a spring arrangement 18, a torque has to be applied to turn the steering spindle 6. The spring arrangement consists of four leaf springs, namely two leaf springs 19 and 20 oppositely curved over their entire length and two planar leaf springs 21 and 22 serving as a supporting plate. These leaf springs engage in the valve members 3 and 4 through radial slots 23 and 24. In the neutral position (FIG. 2), the planar leaf springs 21 and 22 lie against all walls 25, 26, 27, and 28; upon relative rotation, abutment is merely against one of the walls of the slots, in the case of FIG. 3 for example against the walls 25 and 28. The abutment against these walls is over a relatively large area so that the leaf springs 21 and 22 are not excessively stressed or even broken at the supporting points. The curved leaf springs 19 and 20, which have a constant radius of curvature in the unstressed condition, are so prestressed in the neutral position that a central flat section 29 is produced so that the springs are now curved only along their end sections 30. During loading arising out of relative rotation, the planar or flat section 29 is extended to the section 29a whereas the curved sections 30a become shorter.

Figure 4:
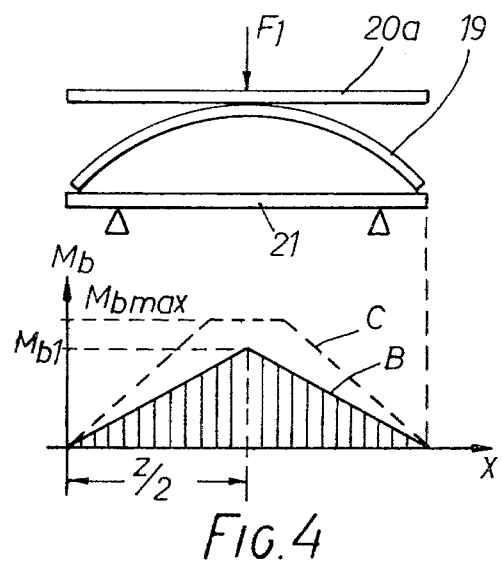
FIG. 4 shows a curved leaf spring which is slightly loaded and the associated bending moment diagram.
Figure 5:
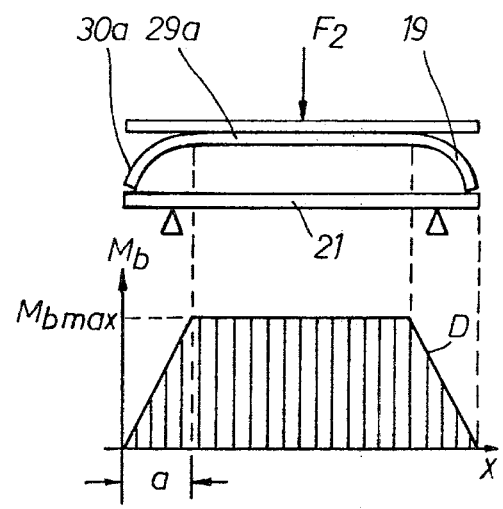
FIG. 5 shows a curved leaf spring which is strongly loaded and the associated bending moment diagram.

This results from the physical properties evident from FIGS. 4 and 5. When the curved leaf spring 19 is loaded by a force $F_1$ by way of an intermediate member 20a, a bending moment $M_b$ as shown in FIG. 4 is produced over the length x of this leaf spring. The respectively largest bending moment is disposed in the middle and is calculated to amount to $$M_{b1} = (F_1/2) \cdot \tfrac{x}{2}$$

This bending moment increases with the force $F_1$ or by, at the position of the largest bending moment, a limiting value of $M_{bmax}$ is finally achieved at which the curvature has been converted to a flat surface. The result of this is that the normally triangular bending moment diagram B is converted to a trapezium-shaped diagram C which is limited at the top by the maximum bending moment. The curve C in FIG. 4 corresponds to clamping of the curved leaf springs 19, 20 in the neutral position. If the force now increases further to a value $F_2$ (FIG. 5), then the flat section 29a of the leaf spring 19 becomes increasingly longer and the curved region 30a becomes ever shorter. This results in the bending moment diagram D in FIG. 5. What should be noted in this connection is that the bending moment to be taken up by the spring has not exceeded the value $M_{bmax}$ because an increase in the force $F_2$ is associated with corresponding shortening of the lever arm a formed by the curved portion 30a. This is why the leaf spring is not overloaded by excessively large bending stresses during normal operation; it therefore has an extraordinarily long life.

Figure 6:
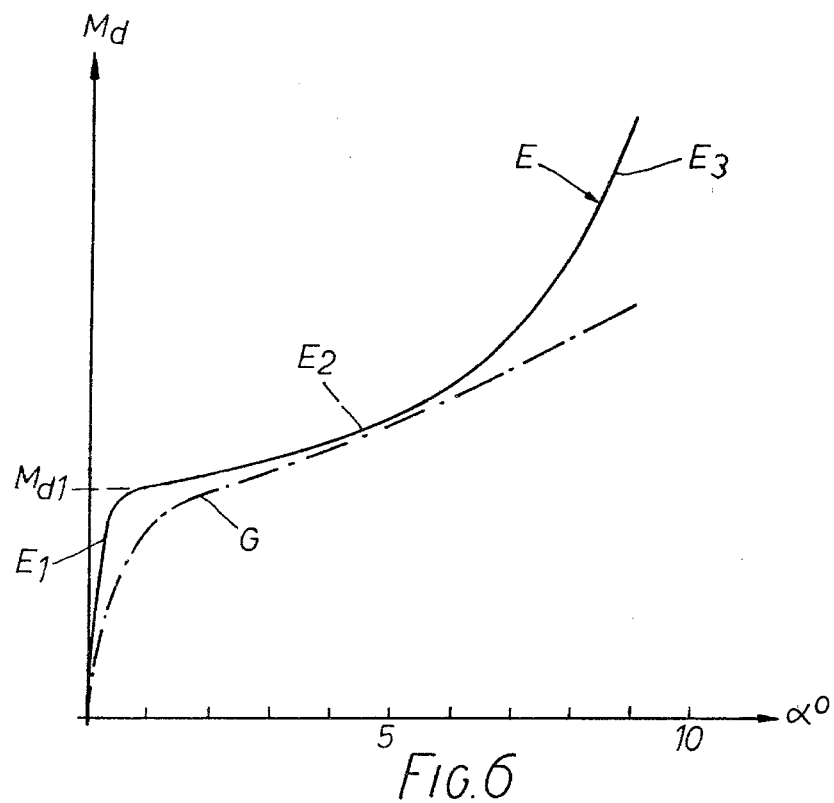
FIG. 6 shows the torque to be applied to the steering spindle in relation to the relative angle of rotation.

In addition, for actuation of the steering spindle 6 one obtains the line E shown in FIG. 6 for the torque $M_d$ required for a particular relative rotation. The line E rises steeply in a first section in the immediate vicinity of the neutral position from zero to a first torque $M_{d1}$. There follows a very gradual rise over a comparatively large section E2, i.e. only a small change in torque is required to alter the angular position. Finally, in the end section E3 the torque rises steeply. The section E1 ensures that the neutral position is very accurately maintained and the steering spindle is also returned to the neutral position with certainty when no external torque is applied. The central section E2 ensures convenient manipulation during steering. The section E3 ensures that the driver will sense the gradual approach to the end of the adjusting range and that the control valve will very rapidly leave the region of large control when the external torque disappears from the steering spindle.

For the purpose of comparison, the characteristic torque line G of the previously mentioned known spring arrangement is shown in chain-dotted lines. It will be evident that the first section is considerably less steep than for the new spring arrangement and that the last steep section is absent altogether.

The described spring arrangement is also suitable for other valve arrangements in which the one valve member is fixed and the other valve member is not only adjustable by the steering spindle but also resettable by a measuring apparatus.

What is claimed is:

1. A control valve assembly for a hydrostatic steering unit, comprising, a measuring motor, inner and outer concentric and relatively rotatable tubular valve members, one of said valve members being connected to said motor, means enabling the other of said valve members to be manually rotated for steering purposes, said valve members having axially aligned and diametrically arranged slots, a pair of planar supporting plates disposed in said slots, a pair of leaf springs disposed in said slots between and in discrete relation to said plates, said leaf springs being curved over substantially their entire lengths including the ends thereof and being arranged in convexedly abutting engagement in said slots between said plates.

2. A control valve assembly according to claim 1, characterized in that said leaf springs are prestressed in the neutral position so that they lie flat on each other at the central portion.

3. A control assembly according to claim 1, characterized in that said leaf springs have a constant radius of curvature.

4. A control assembly according to claim 1, characterized in that said supporting plates are also leaf springs.

* * * * *